Figure 1:
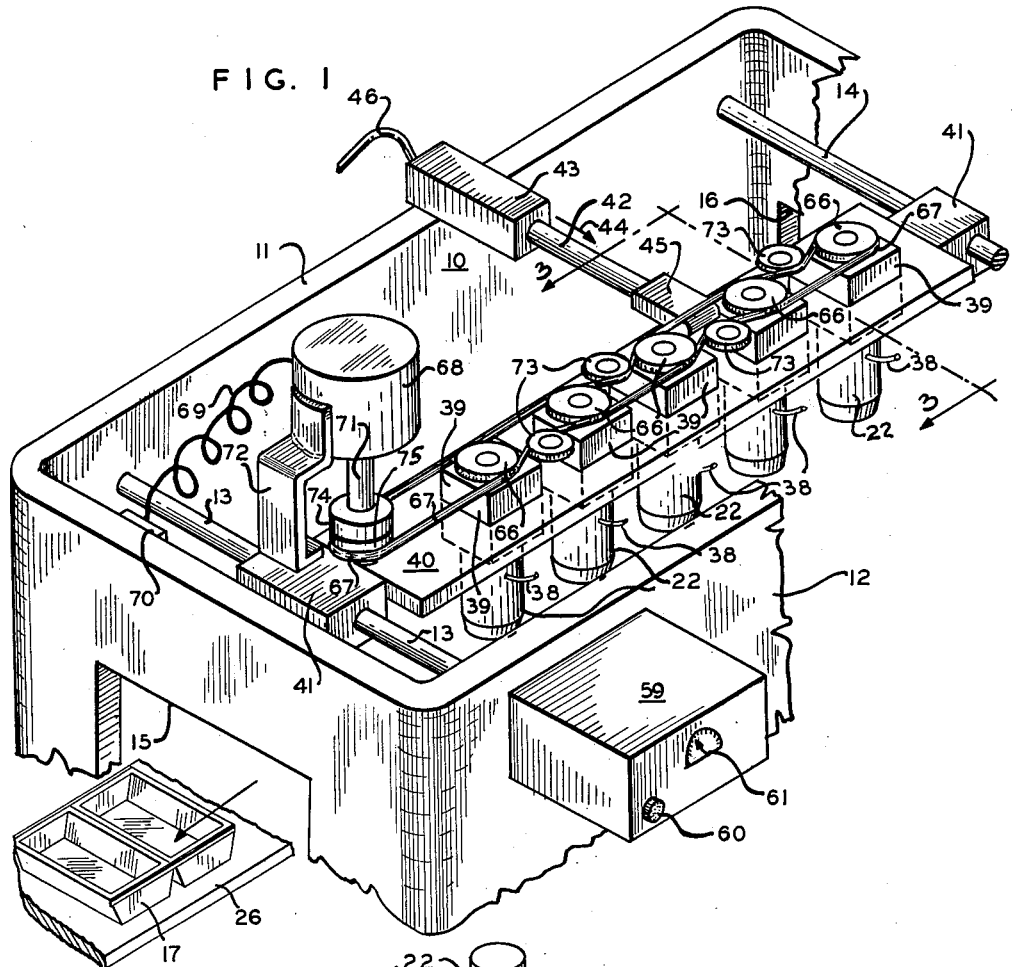

Feb. 19, 1963     I. WIDNER     3,077,857
METHOD OF AND DEVICE FOR GREASING PANS
Filed June 29, 1959     4 Sheets-Sheet 1

INVENTOR.
I. WIDNER
ATTORNEY

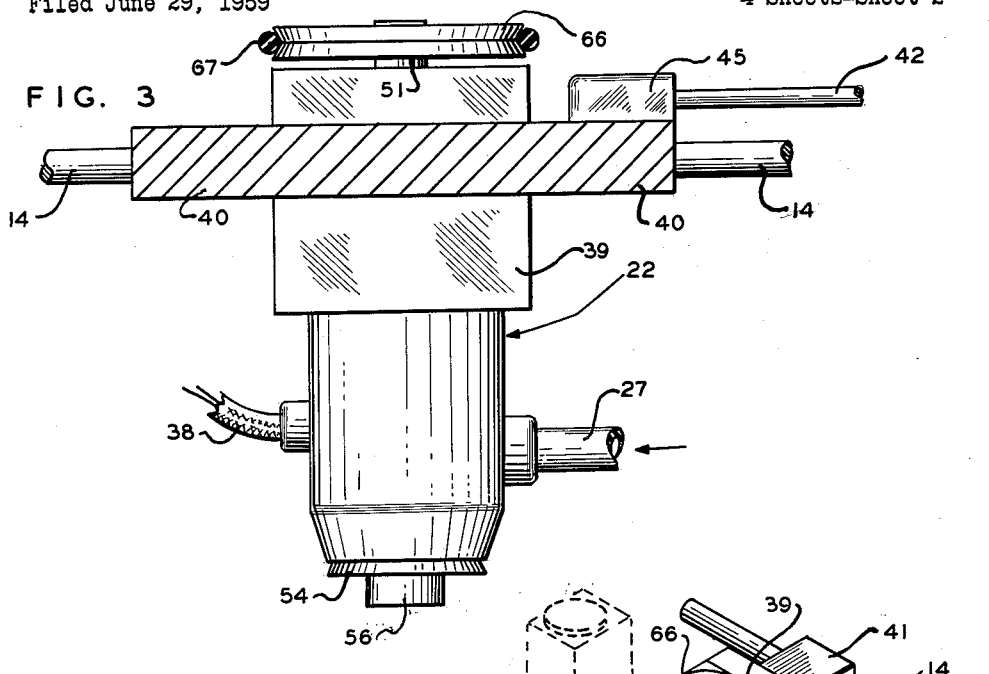
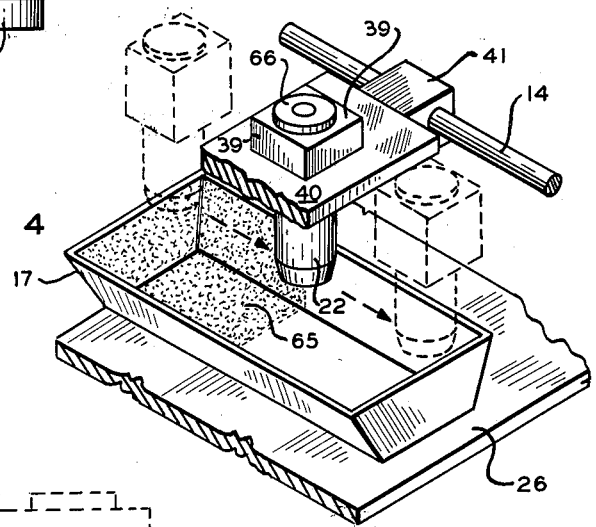
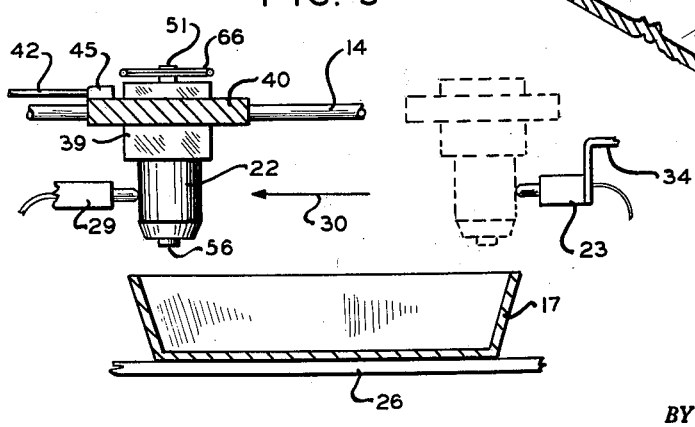

Feb. 19, 1963    I. WIDNER    3,077,857
METHOD OF AND DEVICE FOR GREASING PANS
Filed June 29, 1959    4 Sheets-Sheet 3

INVENTOR.
I. WIDNER
BY
ATTORNEY

Feb. 19, 1963 I. WIDNER 3,077,857
METHOD OF AND DEVICE FOR GREASING PANS
Filed June 29, 1959 4 Sheets-Sheet 4

INVENTOR.
I. WIDNER
ATTORNEY

United States Patent Office 3,077,857
Patented Feb. 19, 1963

3,077,857
METHOD OF AND DEVICE FOR GREASING PANS
Irving Widner, Ridgefield, N.J., assignor to Spray-O-Matic Corp., Palisades Park, N.J., a corporation of New Jersey
Filed June 29, 1959, Ser. No. 823,404
18 Claims. (Cl. 118—2)

This invention relates to the greasing of pans such as bread baking pans, positioned on a conveyor belt or otherwise brought to the greasing station of the device for greasing pursuant to the invention and then passed from the device and filled with dough, baked, emptied and returned for repetition of the greasing cycle. The invention is especially directed to novel procedures, below set forth, for greasing each pan along the longitudinal axis thereof, from one end to the other, on reciprocating movement of dispensing nozzles, in such manner as to completely, uniformly grease the pans.

Figure 2:
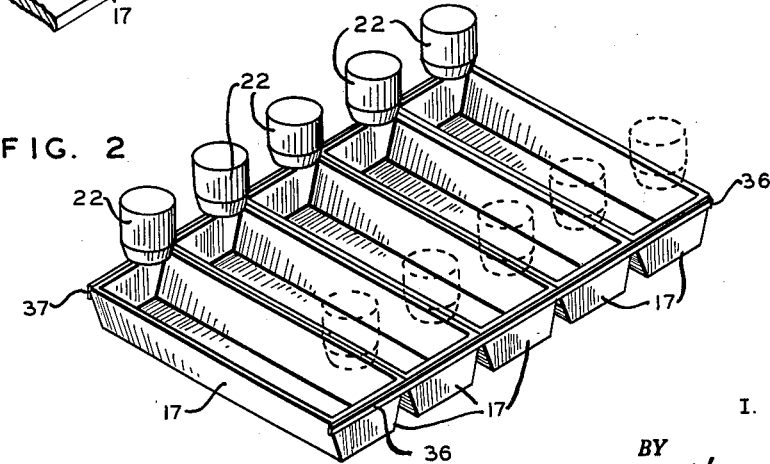

In the accompanying illustrative drawings, similar reference characters indicate like parts:

FIG. 1 is a perspective, fragmentary view of a device embodying the invention,

FIG. 2 is a schematic, perspective view of a group of pans to be greased by nozzles of the invention, shown in dotted line position at one end of the group for the initiation of the pan greasing cycle and in full line position at the other end thereof on the completion of said cycle, FIG. 3 is an enlarged, fragmentary, elevational view, taken at line 3—3 of FIG. 1, FIG. 4 is a schematic, fragmentary, perspective view of the device embodying the invention, FIG. 5 is a fragmentary, transverse elevational view of parts of the device embodying the invention, a pan being shown in longitudinal sectional form positioned in said device, the dotted nozzle indicating the point of initiation of the greasing cycle and, in full lines, the point of completion of the greasing cycle.

Figure 6:
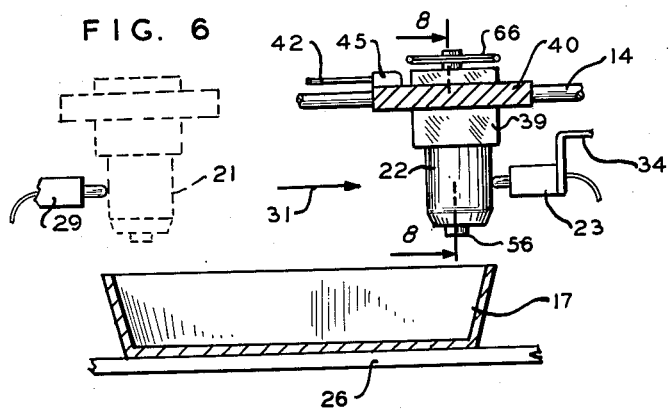
Figure 7:
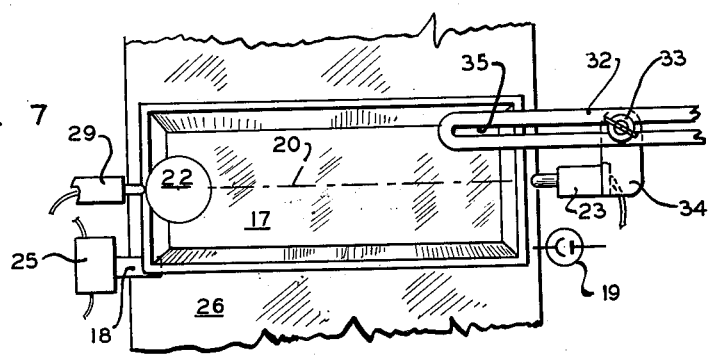
Figure 8:
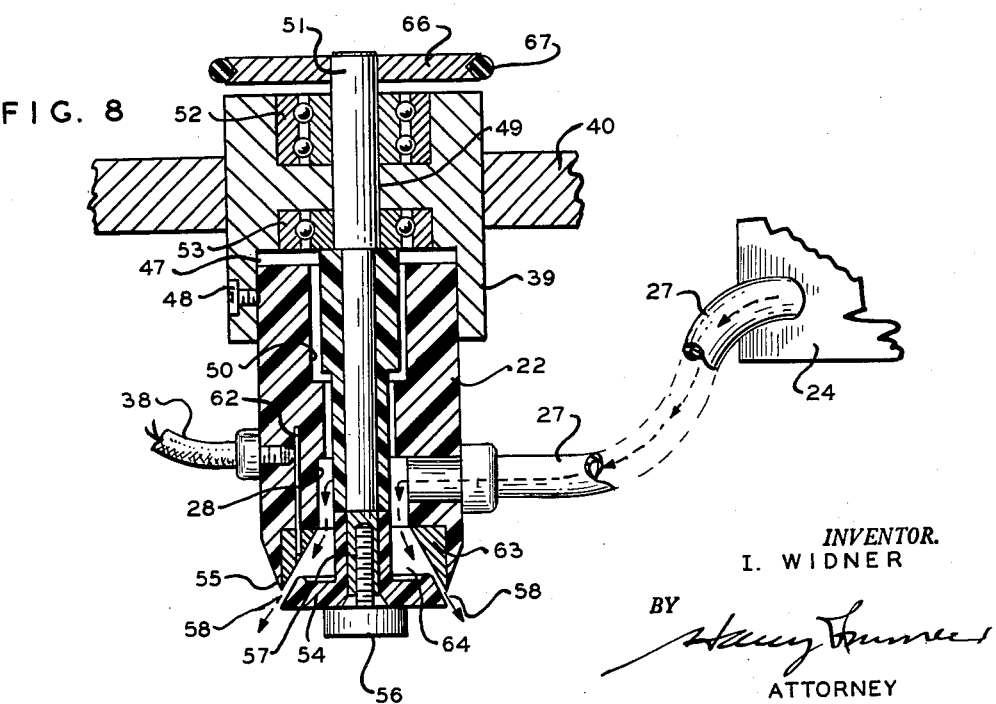
Figure 9:
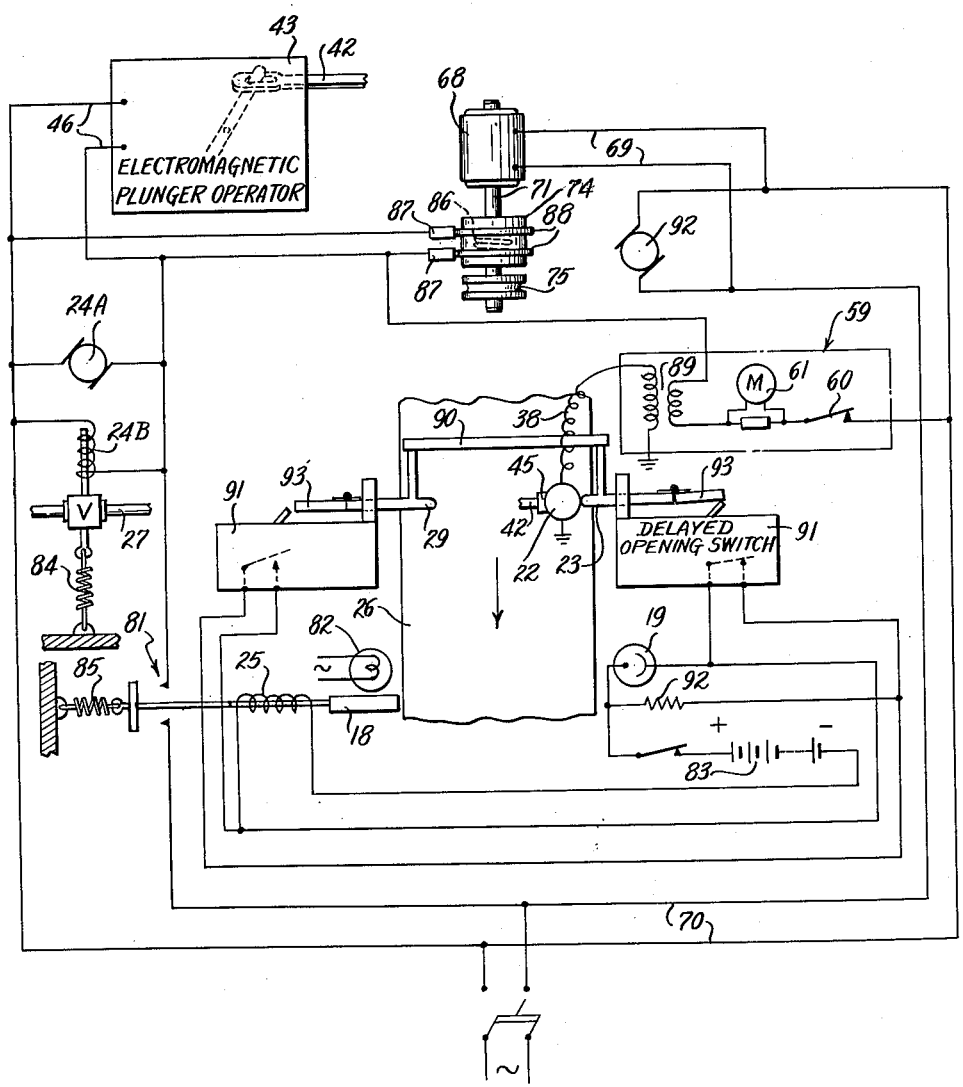

FIG. 6 is a similar view showing the nozzle at the beginning of the next cycle following completion of the FIG. 5 cycle, FIG. 7 is a schematic top plan view of the pan, nozzle and associated parts of the device shown therein, FIG. 8 is a fragmentary vertical sectional view of the nozzle and associated parts, taken at line 8—8 of FIG. 6, and FIG. 9 is a schematic diagram of circuitry and associated parts which may be employed to effect the movement of devices hereinafter described.

The drawings are illustrative of a device embodying the invention comprising a frame 10 having spaced walls 11, 12 and bearings 13, 14 secured to said walls in parallel spaced relation and above the openings 15, 16 in the end walls of said device through which the pan 17 (FIG. 4) to be greased pursuant to the invention is moved and then held in position for greasing as by a brake 18 which may be actuated by means sensing the positioning of the pans at that position, such as a photoelectric cell 19 (FIG. 7). Simultaneously the cycle of greasing the pan along longitudinal axis 20 pursuant to the invention is initiated (FIG. 7) for greasing the pan for example, from the dotted line position 21 (FIG. 6) of the nozzle 22 to the full line position, whereupon the greasing cycle will be automatically ended and the brake will be moved clear of the pan as for example, by switch 23 contacted by the nozzle, actuating the solenoid 25 for the brake 18, as by short circuiting the cell 19. The pan 17 may be moved through the device by conveyor 26 (FIG. 4) which may be an endless belt or other means, continuously operated for moving the pan.

Pursuant to the invention, as below more particularly described, the nozzle 22 is reciprocably disposed in the device above and in registration with the station of the machine at which the pan 17 is held by brake 18.

The brake 18 is normally held in release position by energization of its solenoid through sensing means or cell 19 and may be actuated by motor, switch or other means responsive to said sensing means 19 to hold the pan 17 as shown in FIG. 7 for initiation of a pan spraying cycle and for retraction of the brake on completion of such cycle upon closing of one of the switches 23 and 29 by the nozzle 22.

The grease pumping means and reservoir 24 (FIG. 8) might be solenoid actuated to open the grease line 27 on movement of the pan into position to actuate the sensing member 19 or may be actuated responsive to the brake actuator 25.

The application of the brake 18 upon light to the sensing means 19 being cut off may also actuate the mechanism for initiation of a cycle of movement of a nozzle from one end of the pan to the other, for example, as indicated in FIGS. 2, 4 and 6 from left to right end of the pan as shown in said figures. On completion of such cycle of movement of the nozzle 22 it will contact means such as switch 23, terminating the cycle of movement of the nozzle and also releasing the brake 18 and discontinuing the actuation of the grease pumping means 24. The pan thus greased and no longer held by brake 18 will be carried by the conveyor 26 through the opening 15 and thence to the dough filling station of the bakery or other establishment in which the device is to be used. The next pan placed on belt 26 is moved thereby through opening 16 to the pan greasing station, and the operation repeated, the switch 23 causing actuation of the nozzle reciprocating means to move the nozzle in the direction indicated by the arrow 30 in FIG. 5 until the nozzle reaches the switch 29 which thereupon terminates the nozzle reciprocating cycle and cuts off the grease pumping means 24.

Thus the first pan positioned at the pan greasing station (FIG. 7) is greased in one direction for example from left to right (FIG. 6) and the next pan from right to left (FIG. 5) and then next again from left to right (FIG. 6) the pan greasing nozzle 22 being moved axially along the pan and dispensing grease only while the pan is in said pan greasing station, due to the action of the switches 29, 23 which alternately actuate the reciprocating mechanism for advancing the nozzle 22 lengthwise of the pan and until the greasing of the pan has been completed from one end of the pan to the other. In order to accommodate pans of different axial lengths, bracket 32 (FIG. 7) may be provided, fixed to the frame 10 in any desired or convenient manner, switch 23 in that form of the invention being mounted on a frame 34 passing through a slot 35 in the bracket 32 and secured therein at the desired axially adjusted position by the thumb screw 33 or other means.

The nozzle 22 is moved along the axial length of the pan by a reciprocating means 42—such as gear, air valve or otherwise powered and actuated for the greasing cycle, by the sensing means 19 working through the electric switch, for example, 29, rendered operative in the FIG. 5 cycle by the pressure of the nozzle 22 against the other switch 23 at the end of the prior cycle of movement (FIG. 5) axially along the pan. Switch means 29, 23 are such that each switch not only cuts off the operation of the nozzle moving and grease pumping mechanisms as above described at the end of a cycle of the movement (for example, switch 23 at the full line position of nozzle 22 in FIG. 6) but also resets the other switch—for example, switch 29, so that, for example, when one is closed the other is open. On operation of the sensing means 19 by the positioning of the pan 17 at the pan greasing station, the reset switch (such as 29) will actuate the mechanism for nozzle moving and grease pumping mechanisms above described until the nozzle presses such switch at the termination of its pan greasing cycle, whereupon the mechanism will be disconnected until the pan 17 has been moved out of the pan greasing station and the next pan has moved into said station, initiating a new pan greasing cycle.

The invention may be used for units of one or more than one pan such as multiple pans connected together by means such as bands 36, 37 connecting the pans in groups of four or five as shown in FIG. 2. Where more than one pan constitutes the unit a plurality of nozzles 22 are provided (FIGS. 1 and 2), one for each pan.

The nozzles 22 are mounted in blocks 39 (FIGS. 3 and 8) slidably mounted directly on a bearing guide rod 14 or indirectly as by fixing said blocks 39 in a plate 40 (FIG. 1), said plate in turn being fixed to longitudinally apertured slides 41 slidably engaging the bearing guide rods 13 and 14 and thus slidably disposing the plate 40 and the nozzle 22 in the device in line with the pans at the greasing station where pan or pans are held as by brake 18. The plunger 42 movable in plunger housing 43 is selectively moved in the direction of the arrow 44 (FIG. 1), the full end 45 of the plunger being fixed to plate 40, to move the nozzles 22 from left to right (FIG. 6) and then reversely (FIG. 5). The plunger 42 may be actuated electrically for example, through the cable 46 (FIG. 1) connected with the switch means 29, 23. The nozzle 22 (FIG. 8) is preferably vertically adjustably positioned in recess 47 in the block 39 and is held in desired adjusted position therein by set screw 48 to thus dispose the free lower end 55 of the nozzle at the desired vertically spaced position relative to the pan.

The block 39 is preferably rigidly fixed in the plate 40 and is provided with a longitudinal aperture 49 registering with a longitudinal aperture 50 in the nozzle 22. A rod 51 (FIG. 8) is mounted in the longitudinal apertures 49, 50 of the block and nozzle and preferably also in antifriction bearing means 52, 53. Said rod may, for example be made of metal or other material while the head 54 may be made of a dielectric material secured to the rod by a set screw 56 or the like having threaded engagement with an internally threaded recess 57 at the lower end of the rod 51. The adjustment of the free lower end 55 of the nozzle 22, predetermines the spacing defined between it and the head 54 for passage of grease as indicated by the arrow 58 (FIG. 8). Means are provided for imparting a high voltage charge to the grease passing from the grease line 27 through the nozzle and out the free end 55 thereof. As noted in FIG. 8, high tension line 38 is connected with a source schematically shown at 59, FIG. 1, which may be a source for generating high tension voltage such as 20–30 kv. Said source may be provided with a switch 60 and meter 61 and may be electrically connected with the member 25 (FIG. 7) so as to be operative for passage of high tension voltage into the nozzle 22 only during such time as the pan 17 is held in pan greasing position and is being greased and being rendered inoperative when said pan is released from said position and until the next pan (or group of pans) advance to that position. High voltage wire 38 is preferably connected as by pin conductor 62 which may be force driven into the nozzle 22 from the free end 55 thereof, with a conductor ring 63 which may likewise be force fitted into the lower end of the nozzle or into a recess therein, said ring 63 being upwardly, inwardly tapered at the inner face thereof as indicated at 64 (FIG. 8). The grease passing from the line 27 through the nozzle and over the inner face 64 of the conductor ring 63 thus has imparted thereto a high voltage charge so that said grease particles will be broken up and smoothly flow to the pan 17 and deposited thereon as indicated at 65 in FIG. 4. The rod 51 is preferably rotated in the nozzle 22 so that the grease is whirled in passage through the nozzle (FIG. 8) by fixing the upper end of the rod 51 in a pulley 66 over which is entrained belt 67 driven by the motor 68 connected as by a cable 69 (FIG. 1) with a source of current 70 such as to continuously rotate the armature shaft 71 of the motor. The motor is secured to the plate 40 or to the extension 41 of said plate as by bracket 72 (FIG. 1). The armature shaft 71 has secured to the free end thereof a pulley 75 over which the said belt 67 is entrained to thus drive said belt and thus rotate the pulley rods 51 (and thus also the heads 54 of the rods therewith) idler pulleys being provided if desired as noted at 73 in FIG. 1. The pulley 75 may be held against the enlarged lower end 74 of the armature shaft 71 for rotation in unison therewith by electromagnetic means, for example, which is energized only when the brake 18 is applied or by any other means for uniting the parts 74 and 75. It thus rotates the rods 51 only while the pans are in pan greasing position, such means being likewise controlled for example, by the member 25 for the brake 18. Thus while the motor 68 may be continuously rotated the belt 67 may be rotated by the motor armature shaft only when the pan is in pan greasing (FIG. 4) position. By this arrangement, the motor may be operating at normal speed constantly and thus the heads 54 of the rod 51 will be rotated at their normal rotational speeds and without any appreciable speed lag or stop-start strain on the motor just as soon as the pan positioning means 18 becomes operative responsive to the sensing means 19, the latter initiating the reciprocal movement of the nozzles 22 as above mentioned, the grease pumping means 24 becoming operative at that moment, the high voltage current circuit being then closed, to pass the high voltage current into the nozzle 22 and charge the grease passing through the line 27 into the nozzle 22 and rotating the rods 51 the described conditions being continued until completion of movement of the nozzle 22 from one length of the pan to the other and there being discontinued, as above noted.

Many forms of circuitry may be employed to carry out the invention; without limitation to specific circuitry, a suitable circuit is shown in FIG. 9. In this figure the housing 43 may include, as means for driving the plunger, the mechanism shown in the patent to A. Patz 1,780,939, wherein the switch 81 herein corresponds in function to the switch 32 to 34 in the Patz patent. The switches 91 herein may each correspond to the delayed opening switch of T. L. Clayton 2,590,840, with the member 14 of the Clayton switch extending out of the switch housing.

With no pan in the line of light from the lamp 82 to the photocell 19, and the light to the cell unobstructed, the coil of solenoid 25 is energized, current flowing from the positive end of potential source 83 through the photocell 19, the coil of solenoid 25 and back to the negative end of the potential source. Under this condition the brake 18 is retracted and the switch 81 is open against the compression of a spring 85. Since the switch 81 is open, so is the line leading to a coil 24B for opening the valve in the line 27 against the tension of a spring 84. Also open is the line leading to motor 24A for operating the grease pump as well as the line leading to the electromagnetic plunger operator in housing 43.

The electromagnet coil 86 in the member 74 is also de-energized. The coil 86 is connected to the A.C. lines via switch 81 by brushes 87 and slip rings 88. Finally, the switch 81 controls the energization of the primary of the transformer 89, said primary having in series therein the meter 61 and switch 60, all located in the housing 59. The secondary of the transformer is connected to the nozzle 22 by the lead 38.

When a pan does obstruct the light reaching the photocell, the current in the coil of solenoid 25 is insufficient to hold the brake retracted and to hold the switch 81 open. The brake 18 therefore moves in and holds an oncoming pan or group of pans against movement while the switch 81 closes the previously open circuits. The closing of these circuits opens the valve in line 27, operates the grease pump motor 24A, closes the clutch 74, 75 to rotate the nozzles 22 and closes the circuit to the high voltage transformer. The closing of switch 81 also causes the electromagnetic plunger operator in housing 43 to shift plunger 42 and with it nozzle 22 across the pan, as for example to the right, to the position shown in FIG. 9. As the nozzle engages the operator member 23, the right hand switch 91 is pushed closed by the hinged bar 93. At the same time, by reason of connecting member 90, the left hand switch operator 29 is drawn to the right and prepared ready for action on the left hand switch. The closing of either switch 91 establishes a shunt circuit about photocell 19 which circuit includes a resistance 92 equivalent to the resistance of cell 19 when illuminated. The displacement of the member 23 by the nozzle and the closure of the shunt circuit thus causes the solenoid 25 to be energized to open the switch 81 and to retract the brake to allow the pans to move along with the conveyor. At the same time the devices controlled by the switch 81 are rendered inoperative. After the pans have passed by the photocell the closed delayed action switch 91 opens, removing the shunt circuit about the photocell and preparing the photocell for stoppage by the brake of the next pan or group of pans on the conveyor. When the next pan arrives before the cell 19, the described operation is repeated except that the plunger 42 is retracted, the nozzle moves to the left in FIG. 9 and the left hand switch 91, in parallel with the companion right hand switch, is operated to establish the shunt circuit for the photocell.

The disclosure herein will enable those skilled in the art to practice the same by the utilization of means such as shown specifically in the drawing, for practicing the method and device of the invention. The above described methods and devices and all others coming within the scope of the appended claims shall be deemed to be within the purview of and covered by this invention.

Having thus described my invention, what I claim as new and desire to secure by Letters Patent is:

1. In a device for greasing an elongated, open pan, intermittently operating means for positioning said pan in said device, a straight line bearing secured to said device above said pan and disposed substantially parallel to the longitudinal axis of the pan, a block slidably engaging the bearing for movement therealong in a straight line above the pan, a grease dispensing nozzle secured to said block and movable therewith depending therefrom in downwardly spraying relation to the pan, means for supplying grease to said nozzle, means in said device for engaging and moving said block and thereby the nozzle along the bearing, whereby said nozzle may be moved along the longitudinal axis of and above the pan, thereby dispensing grease along said longitudinal axis and into the pan, and means under control of the position of the nozzle for initiating the operation of the intermittently operating means.

2. In a device for greasing a pan as set forth in claim 1, said means for so positioning said pan in said device comprising means for conveying said pan through said device at right angles to the longitudinal axis of said pan, and means in said device for holding said pan in alignment with the bearing for alignment with the nozzle against the action of said conveying means as the nozzle is so moved along the bearing.

3. A device for greasing a pan as set forth in claim 1, and means in said nozzle for applying a high voltage electrical charge to said grease so dispensed from the nozzle.

4. In a device for greasing a pan as set forth in claim 1, means for moving said pan into alignment with the bearing, and means for actuating said means for applying a high voltage electrical charge only while the pan is so aligned with the bearing.

5. In a device for greasing an elongated pan as set forth in claim 1, said means in said device engaging said block and moving said block, and thereby the nozzle, along the bearings including electrical switch means for initiating the cycle of movement of said block at one end of the pan and for terminating such cycle of movement at the other end of the pan.

6. A device for greasing a pan as set forth in claim 1, said grease dispensing nozzle being secured to said block for adjustable movement toward and away from the pan.

7. In a device for greasing an elongated open pan as set forth in claim 1, wherein the nozzle has an axial aperture, a conductor ring secured within the nozzle adjacent the lower end thereof and extending to the very lower end of the nozzle and being upwardly inwardly tapered and communicating with said axial aperture, and means electrically connecting said ring with a high voltage source to electrically charge the grease passing through said nozzle and along the ring out of the lower end thereof.

8. In a device as set forth in claim 1, said bearing comprising parallel members in said device, said block engaging one of the bearing members, and a second block engaging the other bearing member, said nozzle being secured to said blocks.

9. In a device for greasing a pan as set forth in claim 1, said nozzle having an axial opening therethrough, a rod rotatably positioned in said opening, a head at the lower end of the rod spaced from the lower end of the nozzle, and high voltage means within the lower end of the nozzle.

10. In a device for greasing a pan as set forth in claim 9, and means for rotating said rod in the nozzle only while the pan is so positioned in said device.

11. In a device for greasing an open pan as set forth in claim 9, constantly rotating means engaging and rotating said rod only while the pan is so held in said device.

12. In a device for greasing an elongated pan, as set forth in claim 9, means connecting said head with the lower end of the rod.

13. In a device as set forth in claim 12, said head being formed of dielectric material.

14. In a device for greasing a series of elongated open pans secured together for movement in unison, means for holding said pans in said device, a bearing, means securing said bearing to said device above said series of pans and substantially parallel to the longitudinal axes of the pans, a block slidably engaging said bearing, grease dispensing nozzles secured to said block equidistant the spacing of the pans and movable therewith and depending therefrom in downwardly spraying relation thereto, means in said device for engaging and moving said block and thereby the nozzles along said bearing, means for supplying grease to said nozzles, whereby said nozzles may be moved along the longitudinal axes of and above the pans to dispense grease into and along said longitudinal axes of the pans, intermittently operated means for controlling the feeding of the secured together pans past the nozzles, and means under control of one of said nozzles for initiating the operation of the intermittently operated means at definite positions of the nozzle.

15. A machine for greasing elongated upwardly open pans comprising means for conveying said pans in a direction transverse to their lengths, means for braking the movement of a pan upon reaching a greasing position, grease-dispensing means mounted to move with strokes one way and then the other longitudinally above a pan positioned therebeneath to spray grease thereon, means to effect such movement, sensing means to cause application of said braking means upon a pan when it reaches greasing position, means operated by said dispensing means to neutralize the effect of said sensing means and release said braking means at the end of each stroke of said dispensing means, to allow the greased pan to be moved away and the next one brought to and braked in greasing position, each pan being greased by a single stroke of the dispensing means, and means to effect reversal of movement of said dispensing means each time the braking means is released and reapplied.

16. A machine as recited in claim 15, wherein means is provided for pumping grease to the dispensing means only after the braking means has been applied and until the next brake release.

17. A machine as recited in claim 15, wherein means is provided for rotating the grease dispensing means only after the braking means has been applied and until the next brake release.

18. A machine as recited in claim 15, wherein means is provided for applying high voltage to the grease dispensing means only after the braking means has been applied and until the next brake release.

References Cited in the file of this patent

UNITED STATES PATENTS

| | | |
|---|---|---|
| 1,443,407 | Wittmann | Jan. 30, 1923 |
| 2,246,502 | Bramsen et al. | June 24, 1941 |
| 2,263,011 | Roselund | Nov. 18, 1941 |
| 2,415,194 | Roselund | Feb. 24, 1947 |
| 2,509,448 | Ransburg et al. | May 30, 1950 |
| 2,616,390 | Klinck | Nov. 4, 1952 |
| 2,695,592 | Szcezepanski | Nov. 30, 1954 |
| 2,736,671 | Ransburg et al. | Feb. 28, 1956 |
| 2,744,033 | Juvinall | May 1, 1956 |
| 2,809,902 | Ransburg | Oct. 15, 1957 |
| 2,955,565 | Schotland | Oct. 11, 1960 |

FOREIGN PATENTS

| | | |
|---|---|---|
| 570,351 | France | Jan. 5, 1924 |
| 315,973 | Italy | Dec. 1, 1933 |
| 710,852 | Great Britain | June 23, 1954 |